United States Patent [19]

Woods, Jr.

[11] Patent Number: 5,424,144
[45] Date of Patent: Jun. 13, 1995

[54] ONE PIECE SEPARATOR PLATE WITH INSERT RING STEP DESIGN

[75] Inventor: Richard R. Woods, Jr., Naperville, Ill.

[73] Assignee: M-C Power Corporation, Burr Ridge, Ill.

[21] Appl. No.: 140,248

[22] Filed: Oct. 21, 1993

[51] Int. Cl.⁶ .................................................. H01M 8/02
[52] U.S. Cl. ........................................... 429/35; 429/39
[58] Field of Search .............................. 429/35, 38, 39

[56] References Cited

U.S. PATENT DOCUMENTS

| | | |
|---|---|---|
| 3,514,333 | 5/1970 | Novack . |
| 3,723,186 | 3/1973 | Borucka et al. . |
| 3,867,206 | 2/1975 | Trocciola et al. . |
| 4,160,067 | 7/1979 | Camara et al. ............ 429/16 |
| 4,329,403 | 5/1982 | Baker ........................ 429/35 |
| 4,510,213 | 4/1985 | Schnacke ................... 429/36 |
| 4,579,788 | 4/1986 | Marianowski et al. ..... 429/16 |
| 4,604,331 | 8/1986 | Louis ......................... 429/35 |
| 4,609,595 | 9/1986 | Nickols ...................... 429/35 |
| 4,708,916 | 11/1987 | Ogawa et al. .............. 429/38 |
| 4,748,092 | 5/1988 | Hekal ......................... 429/35 |
| 4,751,153 | 6/1988 | Roth .......................... 429/35 |
| 4,761,348 | 8/1988 | Kunz et al. ................. 429/35 |
| 4,769,289 | 9/1988 | Kelly et al. ................. 428/404 |
| 4,778,736 | 10/1988 | Kaji et al. ................... 429/38 |
| 4,942,099 | 7/1990 | Isobe et al. ................. 429/35 |
| 4,943,495 | 7/1990 | Okada et al. ............... 429/35 |
| 4,963,442 | 10/1990 | Marianowski et al. ..... 429/13 |
| 4,997,727 | 3/1991 | Bossel ........................ 429/33 |
| 5,045,413 | 9/1991 | Marianowski et al. ..... 429/13 |
| 5,077,148 | 12/1991 | Schora et al. .............. 429/16 |
| 5,084,364 | 1/1992 | Quaadvliet ................. 429/34 |
| 5,145,754 | 9/1992 | Misawa et al. ............. 429/32 |
| 5,185,220 | 2/1993 | Schora ....................... 429/35 |
| 5,232,792 | 8/1993 | Reznikov ................... 429/39 X |

Primary Examiner—Stephen Kalafut
Attorney, Agent, or Firm—Speckman, Pauley & Fejer

[57] ABSTRACT

A one-piece separator plate suitable for use in a fuel cell stack comprising a single pressed metal plate having a peripheral raised seal region on a face of said pressed metal plate and a corresponding peripheral recessed seal region on the opposite face thereof, the corresponding peripheral recessed seal region forming a peripheral channel on said opposite face of the pressed metal plate. A peripheral insert ring is disposed in the peripheral channel, which insert ring and said peripheral raised seal region form seals between the faces of the pressed metal plate and an adjacent active cell component.

11 Claims, 4 Drawing Sheets

ONE PIECE SEPARATOR PLATE WITH INSERT RING STEP DESIGN

BACKGROUND OF THE INVENTION

1. Field of the Invention

This invention relates to a separator plate suitable for use in various known types of fuel cells, such as molten carbonate fuel cells, solid oxide fuel cells, polymer electrolyte fuel cells, and phosphoric acid fuel cells. More particularly, this invention relates to a separator plate suitable for use in internally manifolded fuel cell stacks.

Generally, fuel cell electrical output units are comprised of a stacked plurality of individual cells separated by inert or bi-polar electronically conductive ferrous metal separator plates. Individual cells are sandwiched together and secured into a single stacked unit to achieve desired fuel cell energy output. Each individual cell generally includes an anode and cathode electrode, a common electrolyte "tile" or "matrix" typically referred to as the active area components, and a fuel and oxidant gas source. Both fuel and oxidant gases are introduced through manifolds to their respective reactant chambers between the separator plate and the active area components. The area of contact between the electrolyte and separator plate to maintain separation of the fuel and oxidant gases and prevent and/or minimize gas leakage is known as the wet seal. A major factor contributing to premature fuel cell failure is corrosion and fatigue in the wet seal area. This failure is hastened by thin-film electrochemical corrosion at stainless steel surfaces of the separator plate causing weakening of the wet seal structure through intracrystalline and transcrystalline cracking. Such failures permit undesired fuel and/or oxidant gas crossover and overboard gas leakage which interrupts the intended electrochemical oxidation and reduction reactions, thereby causing breakdown and eventual stoppage of cell current generation.

In molten carbonate fuel cells, in particular, under fuel cell operating conditions, in the range of about 500° C. to about 700° C., molten carbonate electrolytes are very corrosive to ferrous metals which, due to their strength, are required for fuel cell housings and separator plates. The high temperature operation of stacks of molten carbonate fuel cells increases both the corrosion and thermal stress problems in the wet seal area, especially when the thermal coefficients of expansion of adjacent materials are different.

In addition to providing a wet seal structure between the separator plate and adjacent cell components, the separator plate also provides means for distributing fuel and oxidant gases to their respective reactant chambers. Known separator plates are comprised of a plurality of pieces welded, or otherwise secured, together to form the requisite wet seals and gas distribution means. In accordance with one embodiment of this invention, this invention provides fully internal manifolding of the fuel and oxidant gases to and from the individual cells of an assembled stack in a manner, due to the design of the cell components, in particular, the separator plate, which provides ease of assembly, long term endurance, stability of fuel cell operation, and reduced fabrication time and cost, in particular, for the separator plate.

DESCRIPTION OF PRIOR ART

Commercially viable molten carbonate fuel cell stacks may contain up to about 600 individual cells, each having a planar area in the order of at least 4 square feet. In stacking such individual cells, separator plates separate the individual cells with fuel and oxidant each being introduced between a set of separator plates, the fuel being introduced between one face of a separator plate and the anode side of an active area component and oxidant being introduced between the other face of the separator plate and the cathode side of a second active area component. Due to the thermal gradients between cell assembly and cell operating conditions, differential thermal expansions, and the necessary strength of materials used for the manifold, close tolerances and very difficult engineering problems are presented.

Conventionally, stacks of individual molten carbonate fuel cells have been constructed with spacer strips around the periphery of a separator plate to form wet seals. Various means of sealing in the environment of the high temperature fuel cell wet seal area are disclosed in U.S. Pat. No. 4,579,788 which teaches wet seal strips fabricated utilizing powder metallurgy techniques; U.S. Pat. No. 3,723,186 which teaches the electrolyte itself comprised of inert materials in regions around its periphery to establish an inert peripheral seal between the electrolyte and frameor housing; U.S. Pat. No. 4,160,067 which teaches deposition of inert materials onto or impregnated into the fuel cell housing or separator in wet seal areas; U.S. Pat. No. 3,867,206 which teaches a wet seal between electrolyte-saturated matrix and electrolyte-saturated peripheral edge of the electrodes; U.S. Pat. No. 4,761,348 which teaches peripheral rails of gas impermeable material to provide a gas sealing function to isolate the anode and cathode from the oxidant and fuel gases, respectively; U.S. Pat. No. 4,329,403 which teaches a grated electrolyte composition for a more gradual transition in the coefficient of thermal expansions in passing from the electrodes to the inner electrolyte regions; and U.S. Pat. No. 3,514,333 which teaches housing of alkali metal carbonate electrolytes in high temperature fuel cells by use of a thin aluminum sealing gasket.

U.S. Pat. No. 4,510,213 teaches transition frames surrounding the active portion of the cell units to provide fuel and oxidant manifolds to the gas compartments of the individual cells, the manifold did not pass through the separator plates nor the electrolyte tiles of the cells. The transition frames require complicated insulating between adjacent cells and are made up of several separate and complicated components. U.S. Pat. No. 4,708,916 teaches internal manifolding of fuel and external manifolding of oxidant for molten carbonate fuel cells in which sets of fuel manifolds pass through electrodes as well as electrolytes and separator plates in a central portion and at opposite ends of the individual cells to provide shortened fuel flow paths. The end fuel manifolds are in a thickened edge wall area of the separator plate while the central fuel manifolds pass through a thickened central region and sealing tape impregnated with carbonate or separate cylindrical conduit inserts are provided extending through the cathode.

Internal manifolding has been attempted wherein multiple manifold holes along opposite edges of the cell have been used to provide either co- or counter-current flow of fuel and oxidant gases. These manifold holes for fuel have been located in a broadened peripheral wet seal area along opposing edges, but the manifolds have been complicated structures exterior to the electrolyte or passing through at least one of the electrodes. However, adjacent manifold holes are used for fuel and oxidant which provide short paths across a short wet seal area and leakage of the gases as well as the necessarily broadened peripheral seal area undesirably reducing the cell active area, as shown, for example, in U.S. Pat. No. 4,769,289. Likewise, prior attempts to provide internal manifolding have used multiple manifolded holes along broadened peripheral wet seal areas on each of all four edges of the cell to provide crossflow, but again, short paths between adjacent fuel and oxidant manifolds required similar complicated structures and the holes cause leakage of the gases and further reduce the cell active area.

A fully internally manifolded molten carbonate fuel cell stack is taught by U.S. Pat. Nos. 4,963,442, 5,045,413, and 5,077,148, each of which teaches a separator plate for a molten carbonate fuel cell stack having a flattened peripheral wet seal structure extending to contact the electrolytes on each face of the separator plates completely around their periphery forming a separator plate/electrolyte wet seal under cell operating conditions, and having a plurality of aligned perforations surrounded by a flattened manifold wet seal structure extending to contact the electrolyte on each face of the separator plate, forming a separator plate/electrolyte wet seal under cell operating conditions. In accordance with the teachings of these patents, the separator plates are pressed metal plates in which the flattened peripheral wet seal structure and the extended manifold wet seal structure on one face of the separator plate is a pressed shaping of the metal plate and on the other face of the separator plate is a pressed sheet metal shape fastened to the other face of the metal plate. In particular, the pressed metal plate and the pressed sheet metal shape are fastened to each other using very difficult edge welding techniques to form the basic separator plate. In addition, conduits through the manifold wet seal structures are provided between one set of manifolds and anode chambers on one face of the separator plates for fuel gas and between the other set of manifolds and the cathode chambers on the other face of the separator plates for oxidant. These conduits are formed by corrugated metal or holes through sheet metal structures secured, preferably by welding, to the separator plate. Thus, a separator plate for a fuel cell unit in accordance with the teachings of these patents comprises as many as nine (9) individual pieces welded together. To accommodate the current collectors and electrodes of the fuel cells within the center portion of the separator plate, the wet seal structures are in the form of steps such that the current collectors and electrodes, when disposed in the center portion of the separator plates, are flush with the top portion of the step which forms the wet seal between the separator plate and the electrolyte. Such fit up of pieces into pressed steps results in variable elevational discontinuities which are known to cause cracking of the electrolyte and result in gas crossflow through the electrolyte tiles.

Other means for sealing between a separator plate for a fuel cell and adjacent cell components are taught by U.S. Pat. No. 4,748,092 in which the separator plate is provided with a plurality of channels and resilient sealing rings disposed therein for sealing against the adjacent cell components; U.S. Pat. No. 4,604,331 teaches a fuel cell separator plate having a rectangular flat plate portion and two unitary upper sealing flanges formed by opposite marginal edges of the plate folded upwardly and back on themselves and two lower sealing flanges formed by the other two marginal edges of the plate folded downwardly and back on themselves. Each of the sealing flanges includes a flat wall spaced from the plate, substantially parallel thereto, and two accordion-pleated sidewalls, one of which interconnects the flat wall with a plate and the other of which stops just short of the plate, thereby providing resilient compressibility for sealing the flange in a direction generally normal to the plane of the plate; U.S. Pat. No. 4,943,495 teaches a fuel cell fabricated by laminating the electrolyte layer, the electrode reacting portions, and the gas separating plates, sealed portions of each of the gas separating plates being provided on the periphery of the gas flow passages formed by the separator plate and having a U-shaped cross-section so that they may flex a filling-member filled interior of the peripheral sealed portions; and U.S. Pat. No. 4,609,595 teaches a separator plate for a molten carbonate fuel cell having a plurality of peripheral elongated resilient flanges which form gas-tight seals around the edges of the cell.

U.S. Pat. No. 4,997,727 teaches a separator plate for a high temperature fuel cell stack having corrugations and beveled on its outer periphery at right angles on two sides of the plate in one direction and two sides of the plate in the opposite direction, thereby providing sealing edges perpendicular to the plane of the separator plate. U.S. Pat. No. 4,942,099 teaches a fuel cell having a plurality of unit cells stacked in layers and separated by separator elements formed of a conductive material and having a channel which penetrates the peripheral region thereof. The separator elements are interposed and electrically connected between the adjacent unit cells to form a stacked structure in which the channels are aligned in the stacking direction. A second channel is formed in a cylindrical seal member which is joined to each two adjacent separator elements, which channel is in communication with the channel board through the peripheral region of each separator element, thereby defining manifolds for the intake and exhaust of a fuel gas and an oxidant gas. The cylindrical seal member includes a pair of ring-shaped metal members joined to each two adjacent separator elements and a ring-shaped insulating member interposed between the metal members. Thus, the gases are prevented from leaking out and the adjacent separator elements are insulated from one another.

U.S. Pat. No. 5,145,754 teaches a solid oxide fuel cell having a plurality of flat plate-like laminates spaced in parallel with one another, one surface of each of the laminates being covered with a flat air electrode film, while the other surface is covered with a flat fuel electrode film. The fuel cell is further provided with a plurality of oxidizing gas flow passages arranged between the adjacent laminates and facing the flat air electrode film and a plurality of fuel gas flow passages arranged between the adjacent flat laminates and facing the flat fuel electrode films where the air electrode films, solid electrolyte films and/or fuel electrode films are interposed between the oxidizing and fuel gas flow passages.

U.S. Pat. No. 4,778,736 teaches an electrode substrate provided with a manifold, having two porous and carbonaceous electrode respectively provided with flow channels for a reactant gas and joined to both surfaces of a separator plate by way of a flexible graphite sheet, which separator plate is extended beyond the electrode, and which manifold comprises a gas-impermeable and compact carbon plate provided with a flow passage for supplying the reactant gas and joined to the extended part of the separator by the flexible graphite sheet, the whole composite material being formed into one body as carbon.

Finally, U.S. Pat. No. 5,084,364 teaches a separator plate for molten carbonate fuel cell stacks having openings for fuel and oxidant inlets and outlets, the gas passages through the separator plate having a spring characteristic based on selection of a suitable profile therefor as well as a frame-type spring disposed around the active cell assembly which contains built-in components for conveying the process gases. The profile of the frame spring is matched to the spring characteristics of the gas passage.

SUMMARY OF THE INVENTION

It is one object of this invention to provide a separator plate for a fuel cell which eliminates welding of multiple pieces to create the separator plate including the wet seal regions thereof.

It is another object of this invention to provide a separator plate for a fuel cell which reduces the criticality of controlling the step height dimensions for both the upper and lower wet seal regions of the plate.

It is yet another object of this invention to provide a separator plate for a fuel cell which allows the compressibility of the wet seal to be controlled and tailored separately from fabrication of the metal separator plate.

It is yet another object of this invention to provide a separator plate for a fuel cell whereby the cost and fabrication time for reducing the separator plate compared to the cost and fabrication time for known separation plates is significantly reduced.

These and other objects are achieved in accordance with this invention in a fuel cell stack comprising a plurality of fuel cell units, each said fuel cell unit comprising an anode and a cathode, an electrolyte in contact with one face of the anode and an opposite facing face of the cathode, and a separator plate separating the cell units between the anode and the cathode, forming an anode chamber between one face of the separator plate and anode and a cathode chamber between the opposite face of the separator plate and the cathode. The anode chamber is in gas communication with a fuel gas supply and outlet and the cathode chamber is in communication with an oxidant gas supply and outlet. The electrolytes and separator plates extend to the edge of the fuel cell stack, the separator plates having a flattened peripheral wet seal structure extending to contact the electrolytes on each face of the separator plates completely around their periphery, forming a separator plate/electrolyte wet seal under cell operating conditions. The electrolytes and separator plates are provided with a plurality of aligned perforations, the perforations in the separator plates being surrounded by a flattened manifold wet seal structure extending to contact the electrolyte on each face of the separator plate, forming a manifold wet seal under cell operating conditions, to form a plurality of gas manifolds extending through the cell stack.

The improved separator plate in accordance with one embodiment of this invention comprises a single pressed metal plate having a peripheral raised seal region on one face of the pressed metal plate and a corresponding peripheral recessed seal region on the opposite face of the pressed metal plate corresponding to the peripheral raised seal region. The corresponding peripheral recessed seal region forms a first peripheral channel on said opposite face of the pressed metal plate. A peripheral insert ring is disposed in the first peripheral channel, the peripheral insert ring forming a peripheral insert ring seal and the peripheral raised seal region forming a peripheral raised seal between the respective faces of the pressed metal plate and the adjacent fuel cell components, in particular, at least one of an electrode and an electrolyte.

In accordance with one embodiment of this invention, the separator plate further comprises a manifold raised seal region on one face of the separator plate surrounding at least one of a plurality of perforations in the pressed metal plate and a corresponding manifold recessed seal region on the opposite face of the pressed metal plate corresponding to the manifold raised seal region. The manifold recessed seal region forms a manifold channel on the opposite face of the pressed metal plate in which a manifold insert ring is disposed. The manifold insert ring forms a manifold insert ring seal and the manifold raised seal region forms a manifold raised seal between the respective faces of the pressed metal plate and the adjacent cell components.

For an internally manifolded fuel cell, at least a portion of the manifold insert ring forms at least one opening through which gases flowing through the manifolds are introduced into their respective reactant chambers between the separator plate and the adjacent cell component.

Although generally applicable to internally manifolded fuel cells, the separator plate of this invention is also applicable to other electrochemical reactors.

BRIEF DESCRIPTION OF THE DRAWINGS

These and other features of this invention will be better understood from the following detailed description taken in conjunction with the drawings wherein.

DESCRIPTION OF PREFERRED EMBODIMENTS

Figure 1:
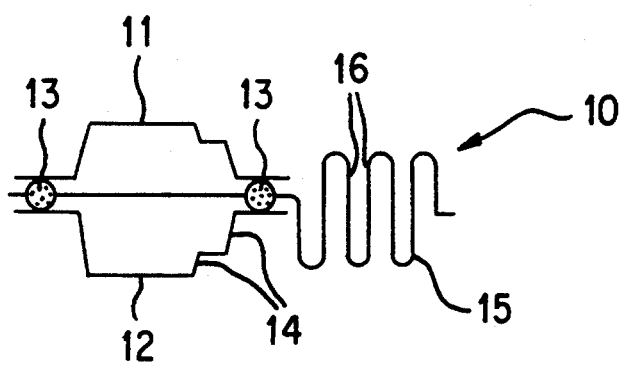
FIG. 1 is a schematic diagram showing a side view of a known separator plate.

FIG. 1 shows a multi-piece separator plate of known design for use in high temperature fuel cell stacks. A fuel cell stack is made up of a plurality of fuel cell units, each fuel cell unit comprising an anode, a cathode, an electrolyte in contact on one side with the anode and in contact on the opposite side with the cathode, and a separator plate separating cell units between the anode of one cell and cathode of the adjacent cell, forming an anode chamber between one side of the separator plate and the anode and a cathode chamber between the opposite side of the separator plate and the cathode. Known separator plate 10 comprises pressed metal plate 15 having flattened wet seal structures 11, 12 extending from the plane of pressed metal plate 15 to contact an active cell component, namely, an electrolyte matrix, a current collector and/or electrode on each face of the separator plate. Flattened wet seal structure 11, 12 extends completely around the periphery of separator plate 10 to form a peripheral wet seal.

For fully internally manifolded fuel cells in which separator plate 10 and the active cell components have aligned perforations, a wet seal structure in the form of flattened wet seal structure 11, 12 also surrounds said aligned perforations forming manifold wet seals, resulting in the formation of a plurality of gas manifolds which extend through the fuel cell stack.

Known separator plate 10 comprises thin pressed metal plate 15 which is provided with corrugations 16 and/or dimples in the fully active fuel cell area and which is pressed to form on one face flattened wet seal structure 11 around the periphery of separator plate 10 and around perforations in separator plate 10. To provide flattened wet seal structure 12 on the opposite face of separator plate 10, a thin metal upstanding seal structure is secured to the opposite face of separator plate 10 by welds 13, thereby forming full peripheral and manifold wet seal structures on said opposite face of separator plate 10. In addition, for internal manifolded fuel cells, conduits through the manifold wet seal structures are provided between one set of manifolds and anode chambers on one face of the separator plates for fuel gas and between the other set of manifolds and the cathode chambers on the other face of the separator plates for oxidant. These conduits are formed by corrugated metal or holes through sheet metal structures secured to the separator plate. Thus, a known separator plate for a fuel cell unit comprises as many as nine (9) individual pieces welded, or otherwise secured together.

To accommodate the active cell components within the center portion of separator plate 10, the flattened wet seal structures 11, 12 form steps 14 such that the active cell components, when disposed in the center portion of separator plate 10, are flush with the top portion of step 14 which forms the wet seal between separator plate 10 and the electrolyte matrix component. Such fit up of pieces into pressed steps results in variable elevational discontinuities which are known to cause cracking of the electrolyte and result in gas cross-flow through the electrolyte tiles.

Figure 2:
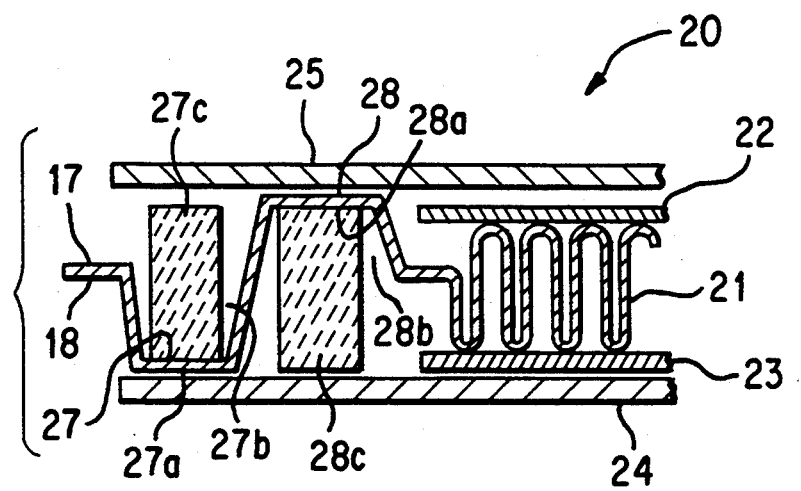
FIG. 2 is a side view of a portion of a fuel cell stack in partial cross-section with a separator plate in accordance with one embodiment of this invention.

FIG. 2 shows a cross-sectional side view of two half cell units 20 of a fuel cell separated by one piece separator plate 21 in accordance with one embodiment of this invention in which flattened wet seal structures 11, 12 of the known separator plate 10 shown in FIG. 1 which are formed by a plurality of pieces are formed by one-piece separator plate 21. Separator plate 21 in accordance with this embodiment of the invention comprises a single pressed metal plate having peripheral recessed seal region 27 on face 17 of said pressed metal plate and a corresponding peripheral raised seal region 27a on the opposite face 18 of said pressed metal plate, said peripheral recessed seal region 27 forming a peripheral channel 27b on said face 17 of said pressed metal plate. Disposed in said peripheral channel 27b is peripheral insert ring 27c which forms a peripheral insert ring seal with electrolyte 25. Adjacent to peripheral raised seal region 27a is peripheral raised seal region 28 which forms corresponding peripheral recessed seal region 28a and channel 28b on opposite face 18 of said pressed metal plate. Disposed in said peripheral channel 28b is peripheral insert ring 28c which forms a peripheral insert ring seal with electrolyte 24.

Peripheral raised seal region 27a on opposite face 18 corresponding to peripheral recessed seal region 27 on face 17 of said pressed metal plate forms a peripheral wet seal surface in contact with electrolyte 24, thereby forming a peripheral wet seal. Process gas on opposite face 18 of one piece separator plate 21 is sealed from the outside by said peripheral wet seal. Similarly, adjacent peripheral raised seal region 28 on face 17 of one piece separator plate 21 contacts electrolyte 25, forming a peripheral wet seal on face 17 of one piece separator plate 21. Process gas on face 17 of one piece separator plate 21 is sealed from the outside by said peripheral wet seal.

Disposed between electrolytes 24, 25 and one piece separator plate 21 are electrodes 22, 23. It should be noted that the terms "raised" and "recessed" with respect to the seal regions of one piece separator plate 21 are related to the face of one piece separator plate 21 to which reference is being made. It is apparent that a recessed seal region as viewed from one face of one piece separator plate 21 corresponds to a raised seal region on the opposite face of one piece separator plate 21.

Figure 3:
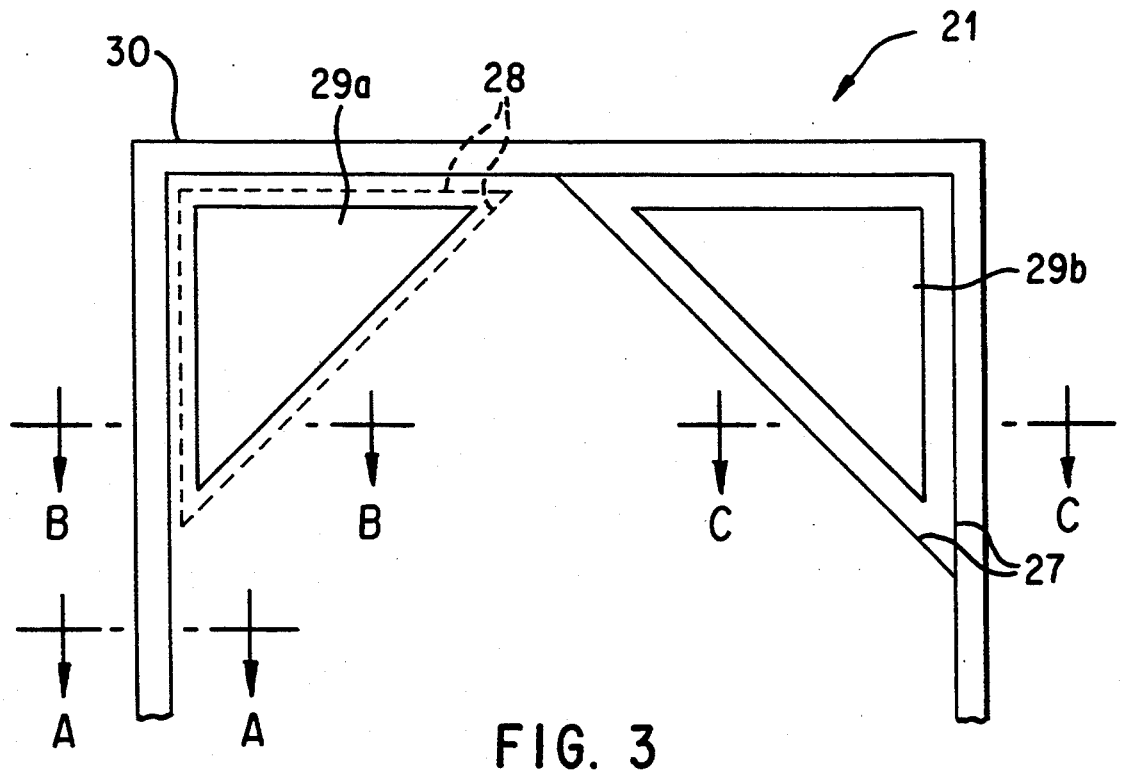
FIG. 3 is a plan view of a portion of a separator plate in accordance with one embodiment of this invention.

FIGS. 3-6 show several views of portions of one piece separator plate 21 in accordance with one embodiment of this invention. FIG. 3 is a plan view of one half of one piece separator plate 21 having perforations 29a, 29b for supplying fuel or oxidant to the respective faces of one piece separator plate 21 in a fuel cell stack. As previously stated, perforations 29a, 29b are aligned with corresponding perforations in the electrolyte tile or matrix to provide internal fuel cell manifolds for distribution of fuel gas and oxidant to the respective anode and cathode chambers disposed between separator plate 21 and the adjacent active cell components, electrodes 22, 23 as shown in FIG. 2. One piece separator plate 21 as shown in FIG. 3 comprises plate edge 30, recessed peripheral and manifold seal regions 27 and raised manifold seal region 28.

Figure 4:
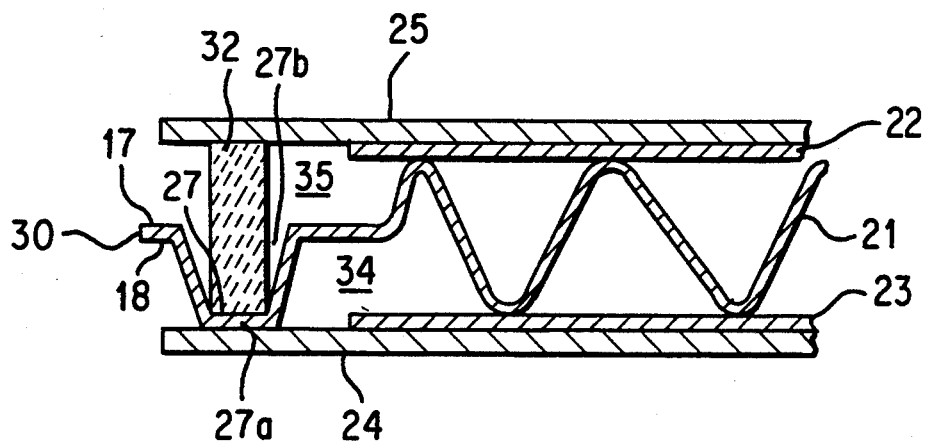
FIG. 4 is a cross-sectional view of the separator plate shown in FIG. 3 in the direction indicated by line A—A.

FIG. 4 is a cross-sectional view of one piece separator plate 21 shown in FIG. 3 along the line A—A. As previously stated, one piece separator plate 21 is a pressed metal sheet formed into raised manifold seal region 28 around perforation 29a which transforms into recessed peripheral seal region 27 on face 17 of one piece separator plate 21 as shown in FIG. 1. Perforation 29a forms a first process gas manifold region of one piece separator plate 21. Separator plate edge 30 forms the boundary between the fuel cell and the outside environment. Insert ring 32 is disposed in peripheral channel 27b and insert ring 33 is disposed in channel 28b (FIG. 2). Peripheral raised seal region 28 forms a peripheral wet seal against electrolyte matrix 25 to prevent leakage of process gas within the manifolds formed by perforation 29a to the environment surrounding the fuel cell. Likewise, adjacent peripheral raised seal region 27a on opposite face 18 of one piece separator plate 21 forms a wet seal against electrolyte matrix 24 to prevent leakage of process gas within the manifolds formed by perforation 29a to the environment surrounding the fuel cell. Insert ring 32 transfers the compressive force from the cell in a fuel cell stack disposed above the cell illustrated in the drawings to the peripheral raised seal region 27a, and likewise, insert ring 33 transfers the compressive force required to effect the seal between peripheral raised seal region 28 and electrolyte tile 25.

Figure 5:
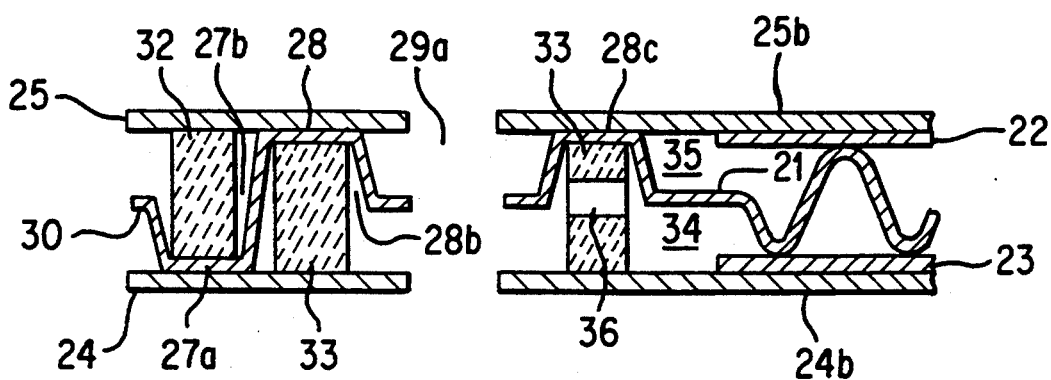
FIG. 5 is a cross-sectional side view of the separator plate shown in FIG. 3 in the direction along the line B—B.
Figure 6:
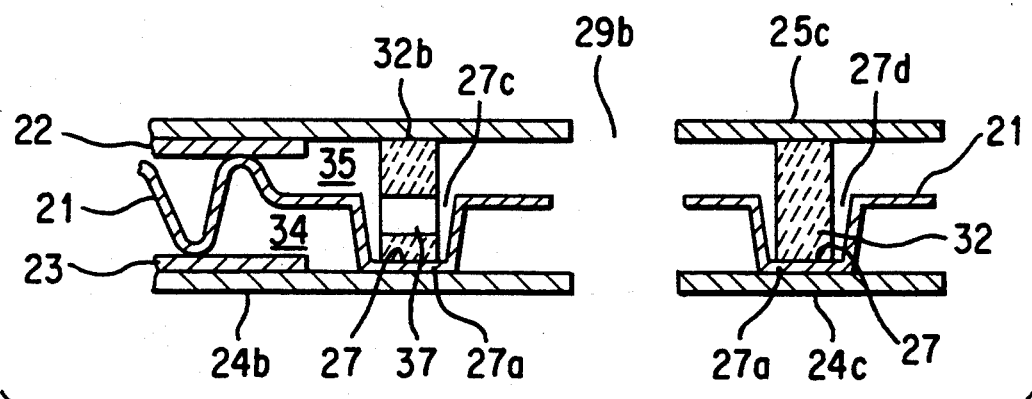
FIG. 6 is a cross-sectional side view of the separator plate shown in FIG. 3 in the direction along line C—C.

FIG. 5 is a cross-sectional view of one piece separator plate 21 shown in FIG. 3 taken along the lines B—B. To provide gas to lower gas cavity 34 from gas manifold 29a, manifold insert ring 33 disposed in raised manifold seal region 28c is provided with opening 36 through which fuel gas or oxidant from gas manifold 29a flows into lower gas cavity 34. Raised seal region 28c forms a wet seal in contact with electrolyte matrix 25b to prevent leakage of process gas within gas manifold 29a into upper gas cavity 35. Similarly, FIG. 6 depicts one piece separator plate 21 shown in FIG. 3 along the line C—C. Process gas within gas manifold 29b flows into upper gas cavity 35 through opening 37 in manifold insert ring 32b disposed in manifold recess channel 27c formed around gas manifold 29b. Raised manifold seal region 27a contacts electrolyte matrix 24b to form a manifold wet seal and prevent leakage of process gas from gas manifold 29b into lower gas cavity 34. Gas leakage from gas manifold 29b into the environment surrounding the fuel cell is minimized by the peripheral insert ring seal formed by insert ring 32 and electrolyte matrix 25c and the insert seal ring formed between insert ring 32 and the surface of manifold channel 27d and by the contact between raised manifold seal region 27a and electrolyte matrix 24c. In this embodiment of the invention, the gas composition within gas manifold 29b and the region surrounding the fuel cell are similar.

Figure 7:
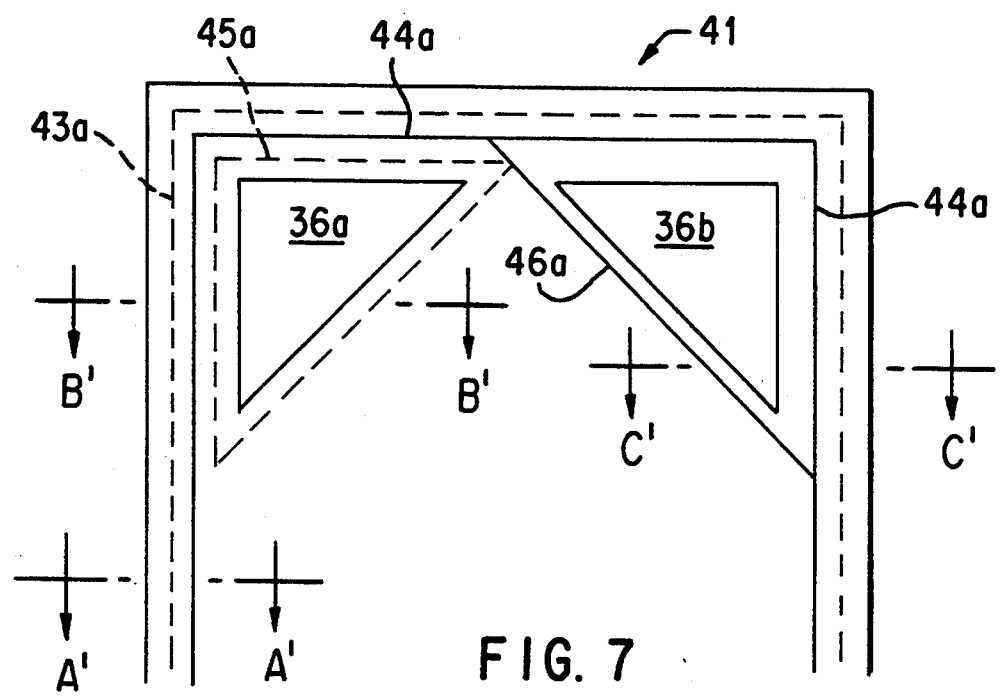
FIG. 7 is a plan view of a separator plate in accordance with another embodiment of this invention.
Figure 8:
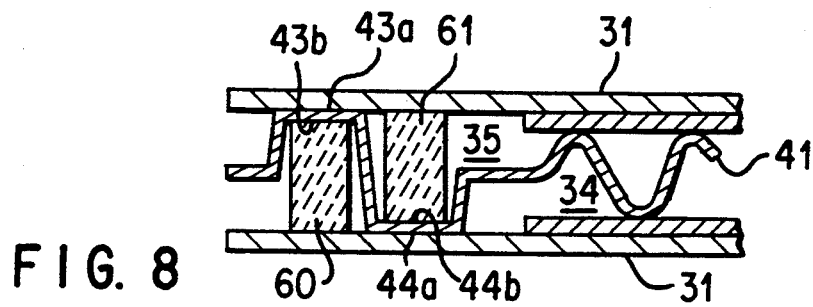
FIG. 8 is a cross-sectional side view of the separator plate shown in FIG. 7 in the direction along the line A'—A'.

FIG. 7 shows a plan view of one piece separator plate 41 for a fuel cell in accordance with another embodiment of this invention in which plate 41 comprises raised seal regions 43a and 44a and corresponding recessed seal regions 43b and 44b. In this embodiment, additional raised seal region 43a is disposed around the entire periphery of separator plate 41. This can best be seen in FIG. 8 which shows a cross-sectional view of separator plate 41 along the line A'—A'.

Figure 9:
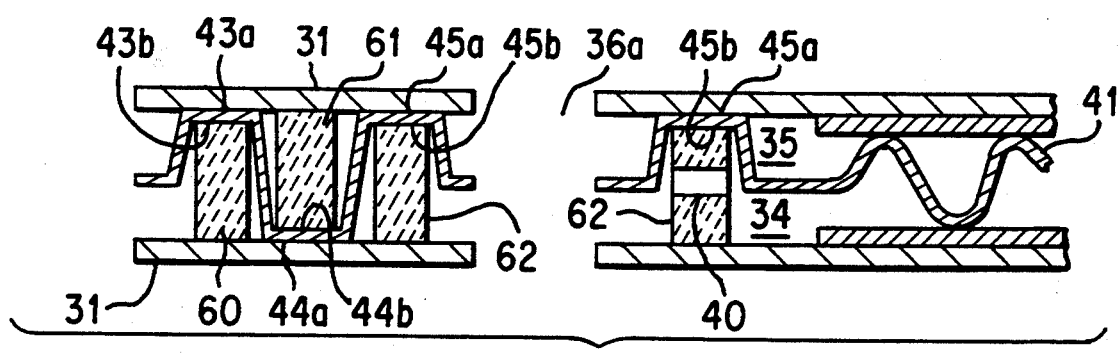
FIG. 9 is a cross-sectional side view of the separator plate shown in FIG. 7 taken along the line B'—B'.
Figure 10:
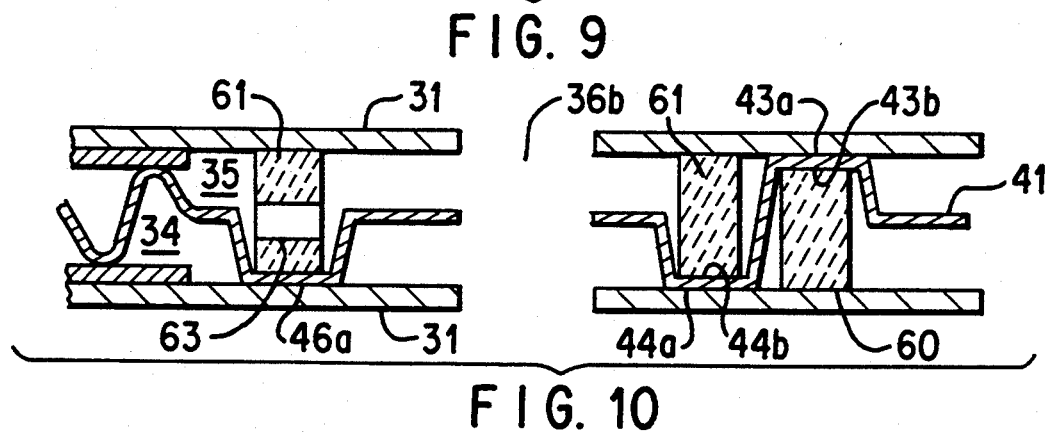
FIG. 10 is a cross-sectional side view of the separator plate shown in FIG. 7 taken along the line C'—C'.

FIGS. 9 and 10 show cross-sectional areas of separator plate 41 shown in FIG. 7 along B'—B' and C'—C', respectively.

One piece separator plate 41 in accordance with this embodiment of the invention, in addition to raised seal regions 43a and 44a and corresponding recessed seal regions 43b and 44b, further comprises raised manifold seal 45a and corresponding recessed manifold seal 45b on opposite faces of plate 41 surrounding perforation 36a as shown in FIG. 7 and raised manifold seal 46a which in conjunction with raised seal region 44a forms a manifold seal around perforation 36b.

Disposed in each channel formed by each corresponding recessed seal region of plate 41 is an insert ring 60, 61, 62 which provides a seal between separator plate 41 and active cell components 31 adjacent to corresponding faces of separator plate 41. In accordance with one embodiment of this invention, manifold insert rings 61, 62 form opening 40, 63 through which gas from gas manifolds 36a, 36b flows into lower and upper gas cavities 34 and 35, respectively, formed between separator plate 41 and the adjacent active components 31. Insert rings suitable for use in the separator plate of this invention may be fabricated as a single piece, or as sections, which can be attached with a ceramic-type paste during assembly of the separator plate into the channels formed by the raised and corresponding recessed seal regions thereof.

Figure 11:
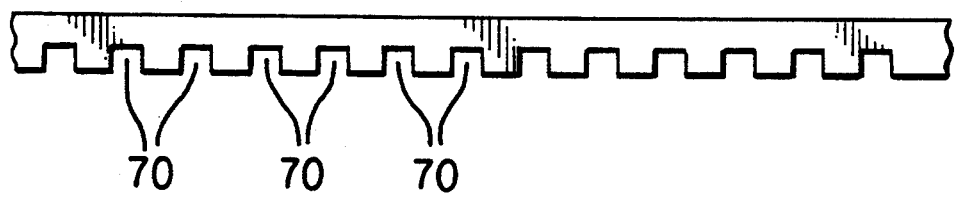
FIG. 11 is a side view of a portion of a manifold insert ring for a one piece separator plate in accordance with one embodiment of this invention.
Figure 12:
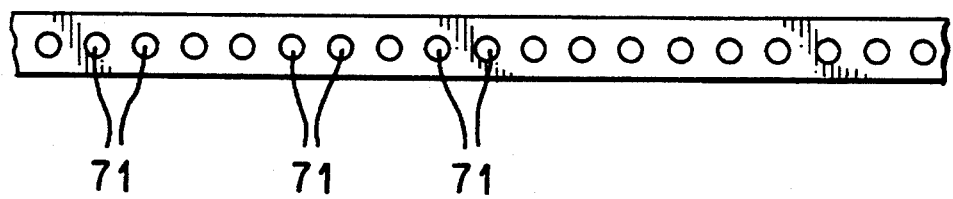
FIG. 12 is a side view of a portion of a manifold insert ring for a one piece separator plate in accordance with one embodiment of this invention.
Figure 13:
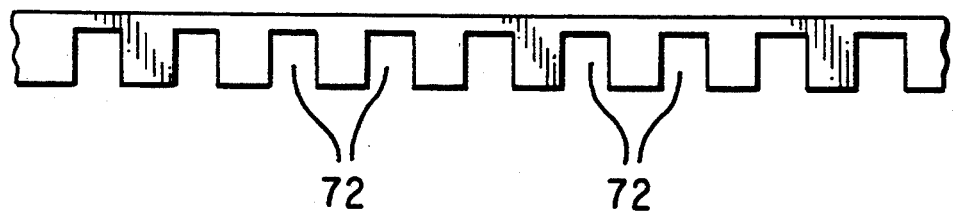
FIG. 13 is a side view of a portion of a manifold insert ring for a one piece separator plate in accordance with one embodiment of this invention.
Figure 14:
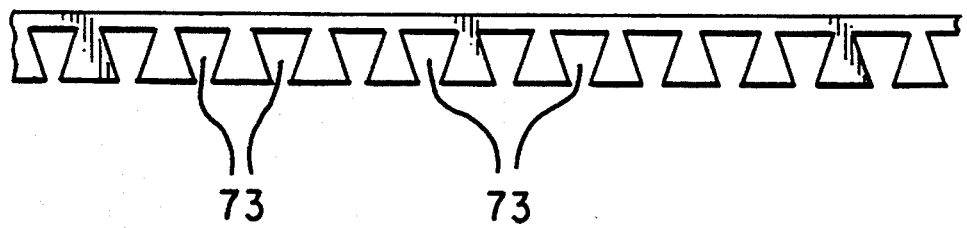
FIG. 14 is a side view of a portion of a manifold insert ring for a one piece separator plate in accordance with one embodiment of this invention.

Several options for providing gas flow from gas manifolds 36a, 36b to corresponding lower and upper gas cavities 34 and 35, resectively, formed between separator plate 41 and adjacent active cell components 31 are shown in FIGS. 11-14. FIG. 11 shows a portion of manifold insert rings 32b, 33, 61, 62 in the form of formed powdered metal forming flow ports 70. FIG. 12 shows said manifold insert rings as a porous metal component with flow ports 71. FIGS. 13 and 14 show said manifold insert rings as folded metal sheet components forming flow channels 72, 73.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a fuel cell stack comprising a plurality of fuel cell units, each said fuel cell unit comprising an anode and a cathode, an electrolyte in contact with one face of said anode and in contact with an opposite facing face of said cathode, and a separator plate separating said cell units between said anode of one said cell unit and said cathode of an adjacent said cell unit forming an anode chamber between one face of said separator plate and said anode and a cathode chamber between the opposite face of said separator plate and said cathode, said anode chamber in gas communication with a fuel gas supply and outlet and said cathode chamber in gas communication with an oxidant gas supply and outlet, said electrolytes and said separator plates extending to the edge of said fuel cell stack, said separator plates having a flattened peripheral wet seal structure extending to contact said electrolytes on each face of said separator plates completely around their periphery forming a peripheral separator plate/electrolyte wet seal under cell operating conditions, said electrolytes and said separator plates having a plurality of aligned perforations, said perforations in said separator plates being surrounded by a flattened manifold wet seal structure extending to contact said electrolyte on each face of said separator plate forming a manifold separator plate/electrolyte wet seal under cell operating conditions to form a plurality of gas manifolds extending through said cell stack, the improvement comprising:

a separator plate comprising a single pressed metal plate having a peripheral raised seal region on a face of said pressed metal plate and a corresponding peripheral recessed seal region on the opposite face of said pressed metal plate, said peripheral recessed seal region forming a first peripheral channel on said opposite face of said pressed metal plate; and a first peripheral insert ring disposed in said first peripheral channel, said first peripheral insert ring forming a first peripheral insert ring seal and said peripheral raised seal region forming a peripheral raised seal between said faces of said pressed metal plate and at least one of an electrode and an electrolyte.

2. In a fuel cell stack in accordance with claim 1, wherein said separator plate further comprises a manifold raised seal region on said face of said separator plate surrounding at least one of a plurality of perforations in said pressed metal plate, a corresponding manifold recessed seal region on the opposite face of said pressed metal plate, said manifold recessed seal region forming a manifold channel on said opposite face of said pressed metal plate, and a manifold insert ring disposed in said manifold channel, said manifold insert ring forming a manifold insert ring seal and said manifold raised seal region forming a manifold raised seal between said faces of said pressed metal plate and at least one of said electrode and said electrolyte.

3. In a fuel cell stack in accordance with claim 1, wherein said separator plate further comprises a peripheral recessed seal region adjacent said peripheral raised seal region on said face of said pressed metal plate forming a peripheral channel on said face of said pressed metal plate, a corresponding peripheral raised seal region on said opposite face of said pressed metal plate, a second peripheral insert ring disposed in said peripheral channel on said face of said pressed metal plate, said second peripheral insert ring forming a second peripheral insert ring seal and said corresponding peripheral raised seal region forming a second peripheral raised seal between said faces of said pressed metal plate and at least one of said electrode and said electrolyte.

4. In a fuel cell stack in accordance with claim 2, wherein at least a portion of said manifold insert ring forms at least one opening through which gases flowing through said manifolds flow into said fuel cell stack.

5. In a fuel cell stack in accordance with claim 2, wherein each of said peripheral insert rings and said manifold insert rings comprises one of a formed powdered metal ring, a ceramic ring, a pressed tubing and a folded metal sheet having a top support sheet.

6. In a fuel cell stack in accordance with claim 2, wherein said insert rings are secured in said channels with a ceramic paste.

7. A separator plate for an electrochemical cell comprising:

a single pressed metal plate having a peripheral raised seal region on one face and a corresponding peripheral recessed seal region on the opposite face, said peripheral recessed seal region forming a peripheral channel on said opposite face of said separator plate; and a peripheral insert ring disposed in said peripheral channel.

8. A separator plate in accordance with claim 7, wherein said pressed metal plate forms at least one perforation, said perforation surrounded by a manifold raised seal region on at least one of said faces of said pressed metal plate and a corresponding manifold recessed seal region on the opposite face of said pressed metal plate, said manifold recessed seal region forming a manifold channel on said opposite face of said pressed metal plate, and a manifold insert ring is disposed in said manifold channel.

9. A separator plate in accordance with claim 7 further comprising a peripheral recessed seal region adjacent said peripheral raised seal region on said face of said pressed metal plate forming a peripheral channel on said face of said pressed metal plate, a corresponding peripheral raised seal region on said opposite face of said pressed metal plate, and a peripheral insert ring disposed in said peripheral channel on said face of said pressed metal plate.

10. A separator plate in accordance with claim 8,
wherein said peripheral insert ring and said manifold insert ring comprise one of a formed powdered metal ring, a ceramic ring, a pressed tubing and a folded metal sheet having a top support sheet.

11. A separator plate in accordance with claim 8, wherein said peripheral insert ring and said manifold insert ring are secured in said peripheral channel and said manifold channel, respectively, by a ceramic cement.

* * * * *